(12) United States Patent
Hollabaugh et al.

(10) Patent No.: US 12,294,824 B2
(45) Date of Patent: May 6, 2025

(54) COMMUNICATION BETWEEN A CASE AND AN EARBUD WITH REDUCED POWER CONSUMPTION

(71) Applicant: Apple Inc., Cupertino, CA (US)

(72) Inventors: James M. Hollabaugh, San Jose, CA (US); Antonio R. De Lima Fernandes, Panaji (IN); Calvin M. Ryan, Berkeley, CA (US); Chandrahas Aralaguppe Chandramohan, San Jose, CA (US); Mitul Mahendrakumar Panchal, San Jose, CA (US)

(73) Assignee: Apple Inc., Cupertino, CA (US)

( * ) Notice: Subject to any disclaimer, the term of this patent is extended or adjusted under 35 U.S.C. 154(b) by 234 days.

(21) Appl. No.: 17/952,016

(22) Filed: Sep. 23, 2022

(65) Prior Publication Data
US 2024/0107218 A1     Mar. 28, 2024

(51) Int. Cl.
*H04R 1/10* (2006.01)
*H02J 7/00* (2006.01)

(52) U.S. Cl.
CPC .......... *H04R 1/1025* (2013.01); *H02J 7/0044* (2013.01); *H04R 1/1091* (2013.01); *H04R 2420/07* (2013.01)

(58) Field of Classification Search
CPC ................ H04R 1/1025; H04R 1/1091; H04R 2420/07; H02J 7/0044
USPC .......................... 381/74, 370, 312, 328, 23.1
See application file for complete search history.

(56) References Cited

U.S. PATENT DOCUMENTS

| | | |
|---|---|---|
| 11,431,185 B1 | 8/2022 | Feng |
| 11,564,028 B2 | 1/2023 | Chen |
| 2017/0302090 A1 | 10/2017 | Han |
| 2018/0276039 A1 | 9/2018 | Boesen |
| 2019/0124432 A1 | 4/2019 | Champy |
| 2019/0200113 A1 | 6/2019 | Kim |
| 2019/0289383 A1* | 9/2019 | Chawan ................ B65D 25/02 |
| 2019/0297408 A1* | 9/2019 | Mohammadi ........ H04R 1/1016 |
| 2019/0394553 A1 | 12/2019 | Pires |
| 2020/0127482 A1 | 4/2020 | Ding |
| 2020/0233046 A1 | 7/2020 | Ding |
| 2021/0249886 A1 | 8/2021 | Moon |
| 2022/0046352 A1 | 2/2022 | Mehrabi |
| 2022/0385085 A1 | 12/2022 | Jeon |
| 2023/0217148 A1 | 7/2023 | Yang |

* cited by examiner

*Primary Examiner* — Thjuan K Addy
(74) *Attorney, Agent, or Firm* — BAKERHOSTETLER (57) ABSTRACT

A case can communicate with one or more earbuds to obtain information related to the earbuds, such as a battery charge level of the earbud. Due to the interface circuits within the case and the earbuds, the case can obtain the information from a power management unit of the earbud without first communicating with a processor (serving as the central processing unit) of the earbud. As a result, the processor can be powered down, i.e., inactive, and the case can still communicate with the earbud. Examples in which the processor can be powered down include when the earbud is in the case and not in use/service by a user, or when the earbud battery charge level is relatively low.

20 Claims, 10 Drawing Sheets

COMMUNICATION BETWEEN A CASE AND AN EARBUD WITH REDUCED POWER CONSUMPTION

The present description relates generally to electronic devices, for example, to an earbud-to-case insertion event detection.

BACKGROUND

An earbud case can house a pair of earbuds, which can receive charge from the battery of the case when inserted in the case. The battery of the case can be charged from an outside source, for example, a power line. Each earbud includes its own radio for communication with a radio of the case, which in turn can establish radio communication with an electronic device, for example, a smartphone, a tablet, a laptop or desktop computer. The radios of the earbuds when in the case are in close proximity of one another to cause intermodulation, which can interfere with earbuds' communication with the case. Moreover, the intermodulation caused by the close proximity between earbud radios may violate certain radio frequency emission regulations.

BRIEF DESCRIPTION OF THE DRAWINGS

Certain features of the subject technology are set forth in the appended claims. However, for the purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

In some aspects, the subject technology is directed to an earbud-to-case insertion event detection. The disclosed solution provides a low-latency earbud-to-case insertion event detection mechanism that allows the communication between the earbud case (hereinafter, "case") and a pair of earbuds (hereinafter, "earbuds") to minimize or prevent interference resulting from intermodulation due to transmission from radios (i.e., radio circuits) of the earbuds and from a radio of the case. The intermodulation of radios of the earbuds occurs when these radios are at close proximity to each other, for example, when the earbuds are inserted in the case. The solution of the subject technology is based on detection of electrical current drawn from the case by a capacitor suitably embedded in each earbud. The electrical current may be drawn upon insertion of each earbud into the case. The case and each of the earbuds includes an interface chip that facilitates a connection to a case interface chip of the case. The interface chips of each earbud and of the case are similar (in terms of hardware and communication protocol) and can be connected via respective dual-pin ports of the interface chips, when mated upon insertion of the earbuds into the case. Accordingly, each of the interface chips of the earbuds includes a dual-pin port (bus) for connection to one of a pair of dual-pin ports of the case interface chip (i.e., one dual-pin port for each earbud) for communications or charging.

The low-latency earbud-to-case insertion detection mechanism of the subject technology allows immediate, or near immediate, reduction of transmission power, or tx power, of the respective radios in the earbuds, upon insertion of each earbud into the case, in order to reduce the intermodulation interference. This solution offers a significant advantage over the existing earbud-to-case insertion detection mechanism, which has a longer latency and longer associated times for establishing communication between the case and the earbuds. For example, the subject technology discussed herein may reduce latency from approximately 250 milliseconds to approximately 250 microseconds. Accordingly, the latency can be reduced by approximately 99.9%, or three orders of magnitude.

In an exemplary embodiment, insertion of either, or both, of the earbuds into the case causes electrical current from a battery, or power supply, of the case to charge a (previously discharged) capacitor in the earbud(s). The flow of electrical current initiates a short-circuit event in the case, causing an interrupt command to be generated and sent to a controller/processor of the case. As a result, the radio of the case is placed in a low-power state, thus reducing transmission power from the radio of the case. Moreover, the electrical current provided by the case to the earbuds may be reduced, thus reducing transmission power of the respective radios of the earbuds.

In some aspects, the subject technology is directed to power management of a communication system by direct current (DC) voltage threshold control. The disclosed solution provides multiple (e.g., three) different tiers of DC voltage levels through an interface chip of a case to a respective interface chip of the earbuds depending on the type of communication and the situation of the earbud. Exemplary communication types include an initial handshake, and a request by the case to the earbuds at the production facility before shipment or at the shipment stage when the devices (earbuds and case) are being shipped. Also, the state of charge of the batteries of the case and earbuds may play a role in deciding which voltage tier is applied to the interface chip of the case and subsequently transmitted to the earbud(s).

In some aspects, the case can communicate with, and receive information from, the earbuds without communicating with a respective processor (e.g., controller or central processing circuitry) of the earbuds. For example, each of the earbuds may include a processor and a power management unit (PMU) that communicates with the processor, which allows the PMU to receive information (e.g., battery charge level of the battery of the earbud) from the processor. Also, each PMU is in communication with the respective interface chips of the earbuds. When the earbuds are stored in the case, the respective processors of the earbuds can be powered down and/or be placed in an inactive state. However, the interface chip of the case can communicate with the interface chips of the earbuds and receive the information stored on the PMUs while bypassing the processor that is powered down or in the inactive state. Beneficially, the processor, which may consume significantly more electrical current than the PMU, can be placed in the powered down or inactive state, thus consuming less electrical current, either from the battery in the earbud or from the battery in the case.

These and other embodiments are discussed below with reference to FIGS. 1-11. However, those skilled in the art will readily appreciate that the detailed description given herein with respect to these Figures is for explanatory purposes only and should not be construed as limiting.

Figure 1:
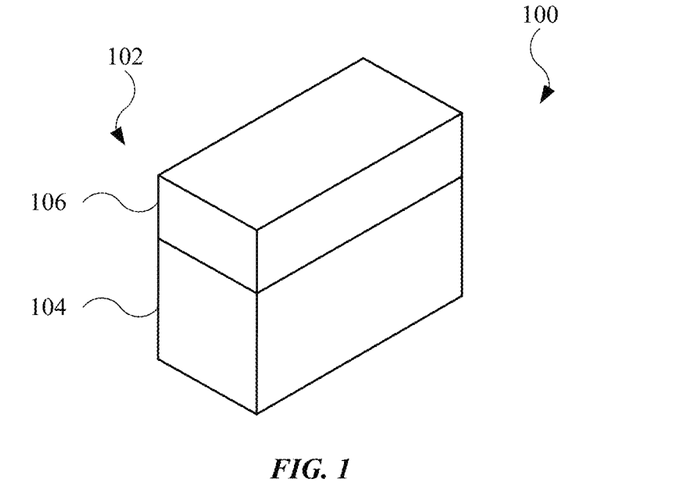
FIG. 1 illustrates a perspective view of a case in a closed position, according to one or more implementations of the subject technology.

According to some embodiments, for example as shown in FIG. 1, a system 100 may include a case 102 that includes a body 104 and a lid 106, or cap, that is rotationally coupled to the body 104. The case 102 may act as an enclosure to store earbuds (e.g., audio output devices) for portability. Also, the case 102 is designed to charge respective batteries, or power sources, of the earbuds. Additionally, the case 102 can query each of the earbuds and receive information, or data, related to a battery charge level of the respective batteries. In this regard, the case 102 may include, but is not limited to, processing circuitry (e.g., controller circuitry, MEMS circuitry, system on a chip (SOC) circuitry), memory circuitry, a battery, and interface (communication) circuitry, with these being components operatively coupled together. As shown in FIG. 1, the case 102 is in a closed position, and the lid 106 covers the body 104 and earbuds within the body 104.

Figure 2:
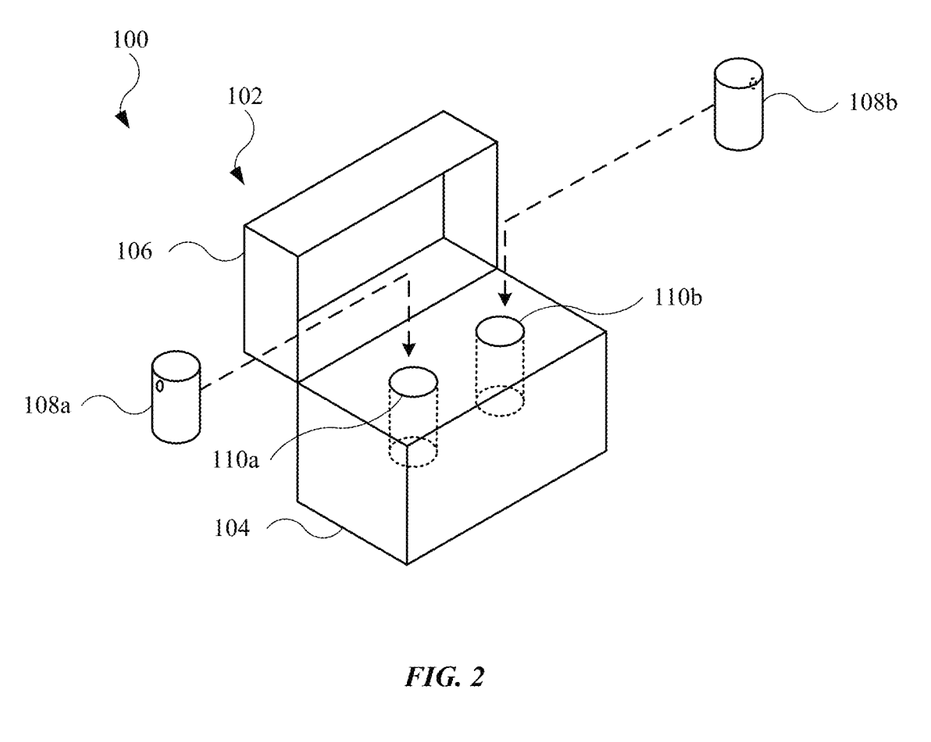
FIG. 2 illustrates a perspective view of a case in an open position, further showing earbuds that can be stored in the case, according to one or more implementations of the subject technology.

FIG. 2 illustrates the system 100, showing the case 102 in an open position. In the open position, the lid 106 is rotated away from the body 104. As shown, the system 100 further includes an earbud 108a and an earbud 108b. The case 102 is designed to hold the earbud 108a and the earbud 108b in a cavity 110a and a cavity 110b, respectively, formed in the body 104. The cavities 110a and 110b may be referred to openings in the body 104. Also, as an example, an insertion or insertion event described herein may be initiated by at least one of the earbud 108a and the earbud 108b being inserted, or at least partially inserted, into the cavity 110a and the cavity 110b, respectively.

In the open position, the case 102 may anticipate receipt of at least one of the earbuds 108a and 108b. In some instances, the case 102 is designed to quickly minimize transmission power of at least one of its transmitter circuits or radio circuits (and/or one of the transmitter circuits of the earbuds 108a and 108b) when a respective radio of at least one of the earbuds 108a and 108b is/are detected, thus reducing the signal strength in which generated radio frequencies by the transmitter circuit(s) is/are transmitted. Beneficially, the reduced transmission power may limit or prevent intermodulation with radio frequency generated by the respective transmitter circuits of the earbuds 108a and 108b. This will be shown and described below. Conversely, in the closed position (shown in FIG. 1), the case 102 may not anticipate receipt of the earbuds 108a and 108b, and thus may not actively reduce the transmission power. Also, in the closed position, the case 102 may cause respective processors of the earbuds 108a and 108b to power down.

I. Earbud Detection in a Case

Figure 3:
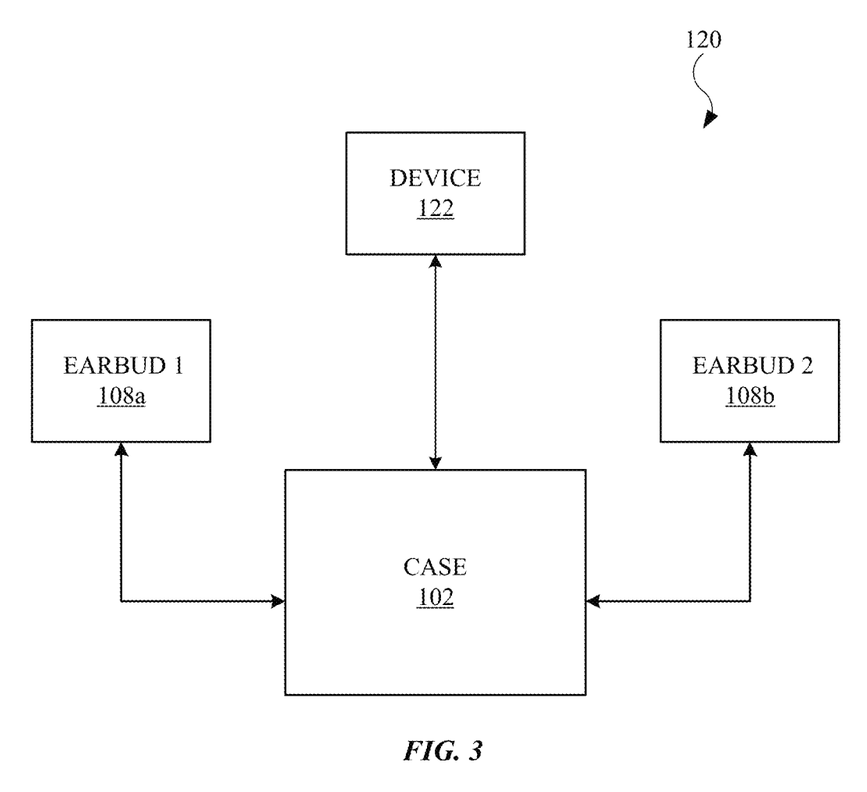
FIG. 3 illustrates a block diagram illustrating an example of an environment within which the subject technology is implemented, according to one or more implementations of the subject technology.

FIG. 3 illustrates a high-level block diagram illustrating an example of an environment 120. In addition to the case 102 and the earbuds 108a and 108b, the environment 120 includes a device 122. Examples of the device 122 includes a mobile wireless communication device such as a smartphone or a tablet, a laptop, a home assistant, or desktop computer. Accordingly, the device 122 may be equipped with wireless radio communication. In this manner, the case 102, the earbuds 108a and 108b, and the device 122 can wirelessly communicate with each other. Alternatively, or in combination, the case 102 may include interface circuits, each with pair of ports, designed to establish a wired communication with respective ports and interface circuits of the earbuds 108a and 108b. The case 102 can be charged from a port (e.g., a universal serial bus (USB)) of the device 122 or any other device or from a power line. The case 102 can charge any of the earbuds 108a and 108b when they are inserted in the case 102.

The earbuds 108a and 108b include their individual radio frequency (RF) radios (e.g., RF transceiver circuitry) used to communicate, using an antenna, over a wireless communication protocol such as BLUETOOTH®). In some cases, the RF radios of the earbuds 108a and 108b can produce intermodulation interference when in close proximity of each other, for example, when both are inside the case 102. The case 102 may include provisions to enable detection of insertion of at least one of the earbuds 108a and 108b into the case 102, as described in more details herein. Upon detection of an insertion event of either or both earbuds 108a and 108b into the case 102, the transmission power of the case 102 and/or earbuds 108a and 108b can be reduced to prevent intermodulation. As a result of the of mitigated intermodulation, communication may occur more rapidly between the case 102 and the earbuds 108a and 108b, as compared to traditional methods, and no resultant violation of RF emission occurs.

Figure 4:
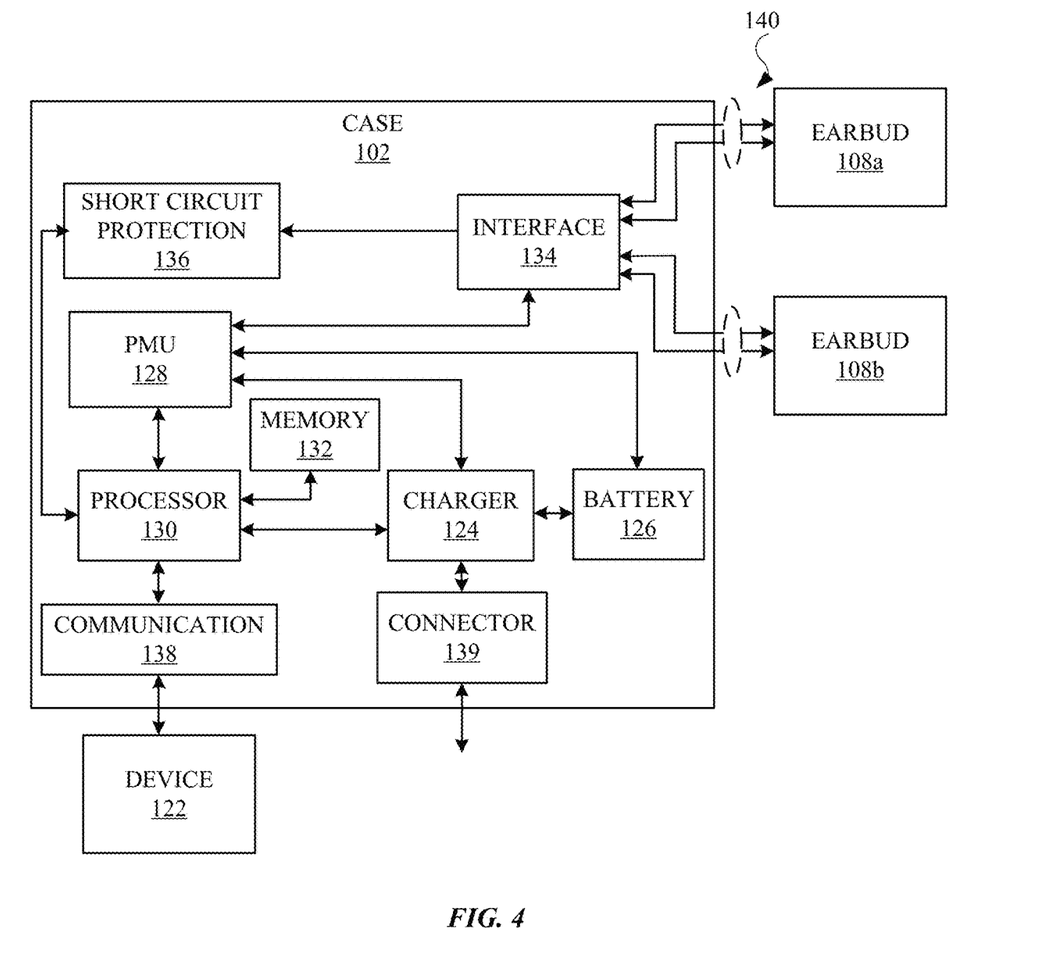
FIG. 4 illustrates a schematic diagram illustrating an example of a device architecture of a case capable of earbud insertion event detection, according to one or more implementations of the subject technology.

FIG. 4 illustrates a schematic diagram illustrating an example of a device architecture of a case 102 capable of earbud insertion event detection. The case 102 includes, but is not limited to, a charger 124, a battery 126, a PMU 128, a processor 130, a memory 132, an interface 134, a short-circuit protection circuit 136 (including a short circuit protection mechanism) and a communication circuit 138. In some embodiments, the battery 126 includes a DC/DC power supply and can be charged by the charger 124. The charger 124 can be connected via a connector 139 (e.g., a USB connector) and a suitable adaptor to a power line or directly to an electronic device, such as the device 122 (shown in FIG. 3). The charger 124 can also provide power, from the battery 126, through the PMU 128 and the interface 134, to earbuds 108a and 108b when inserted to the enclosure of the case 102.

The PMU 128 may include a microcontroller designed to govern or regulate power to various components the case 102, or whichever component in which the PMU 128 resides. As shown, the interface 134 is schematically depicted as a single interface circuit. However, interface 134 may include a dedicated interface (similar in design and function as that of the interface 134) for each of the earbuds 108a and 108b. The interface 134 may include an interface integrated circuit designed to communicate information and/or power to the earbuds 108a and 108b when the earbuds 108a and 108b are located in the case 102. Additionally, the interface 134 can receive information from each of the earbuds 108a and 108b. Also, as a non-limiting example, the communication circuit 138 may include a BLUETOOTH® radio circuit capable of communication with both the device 122 as well as the earbuds 108a and 108b. Accordingly, each of the device 122 and the earbuds 108a and 108b include communication circuits that communicate with the communication circuit 138 of the case 102 over the same protocol, and thus are designed to transmit within a given frequency range. Also, the signal strength in which the communication circuits transmit may be a function of the transmission power. For example, in some embodiments, the signal strength is directly proportional to the transmission power.

The processor 130 may include a microcontroller unit (MCU) and/or an SOC. The PMU 128 is controlled by the processor 130 and can receive suitable commands from the processor 130 regarding timing and voltage level of the charge provided to the earbuds 108a and 108b. For example, the processor 130 may execute instructions stored on the memory 132 to detect insertion of at least one of the earbuds 108a and 108b into the case 102 and instruct the PMU 128 to reduce the transmission power of the communication circuit 138 and/or the transmission power to respective communication circuits of the earbuds 108a and 108b.

The process for detection of the insertion of the earbuds 108a and 108b into the case 102 includes instructing the PMU 128 to apply a voltage (e.g., a positive voltage pulse within a range of 1.8V to 2 V) to a pin (e.g., a signal pin) of a port 140 of the interface 134. In FIG. 4, the port 140 (e.g., bus or functional bus) may represent a pair of ports for each of the earbuds 108a and 108b. Upon insertion of the earbuds 108a and 108b into the case 102, the voltage (applied at the pin of the port 140) can begin to charge a capacitor (not shown in FIG. 4) in each of the (inserted) earbuds 108a and 108b. Electric current provided to the capacitor(s) may include an in-rush current, or surge current. The current drawn by the capacitor is sensed by a current-sensing circuit of the short-circuit protection circuit 136. While the short-circuit protection circuit 136 is shown as a separate/independent sub-system, the short-circuit protection circuit 136 may be integrated with the interface 134. When the in-rush current is at or above a threshold (defined by a predetermined current level), the short-circuit protection circuit 136 sends an interrupt signal to the processor 130 corresponding to a short-circuit event. The short-circuit event can be interpreted by the processor 130 as an insertion of at least one of the earbuds 108a and 108b into the case 102. The processor 130, in turn, sends a signal to the PMU 128 to reduce or turn off the voltage applied to the pin of the interface 134. As a result, the transmission power to the interface circuits of the earbuds 108a and 108b can be reduced, thus reducing the signal strength of the transmitted RF energy of the respective radios of the earbuds 108a and 108b. Additionally, or alternatively, the transmission power to the communication circuit 138 is reduced, thus reducing the signal strength of the transmitted RF energy from the communication circuit 138. Beneficially, intermodulation may be avoided or minimized between the case 102 and the earbuds 108a and 108b. Moreover, the described short-circuit detection process used to trigger the reduced transmission power may occur more quickly as compared to traditional methods implemented in cases and earbuds, thus reducing intermodulation at a faster rate and reducing the time for initiating communication between the case 102 and the earbuds 108a and 108b. In some implementations, the processor 130 may receive a signal indication that a lid (e.g., lid 106) of the case 102 is closed and use this signal to instruct the PMU 128 to turn off the applied voltage. This can disable the described process involving the short-circuit protection circuit 136, as it is needed subsequent to insertion of the earbuds 108a and 108b into the case 102.

When the insertion of the earbuds 108a and 108b into the case 102 is detected, the processor 130 may periodically request a state of charge of the respective batteries of each of the earbuds 108a and 108b and, based on the received state of charge, instruct the PMU 128 to start and/or stop provision of charging of the batteries of the earbuds 108a and 108b. The provision of charging of the batteries of the earbuds 108a and 108b takes place through the pins of the port 140 of the interface 134, which are connected to corresponding pins (e.g., signal and ground pins) of a port of a respective interface of the earbuds 108a and 108b.

Figure 5:
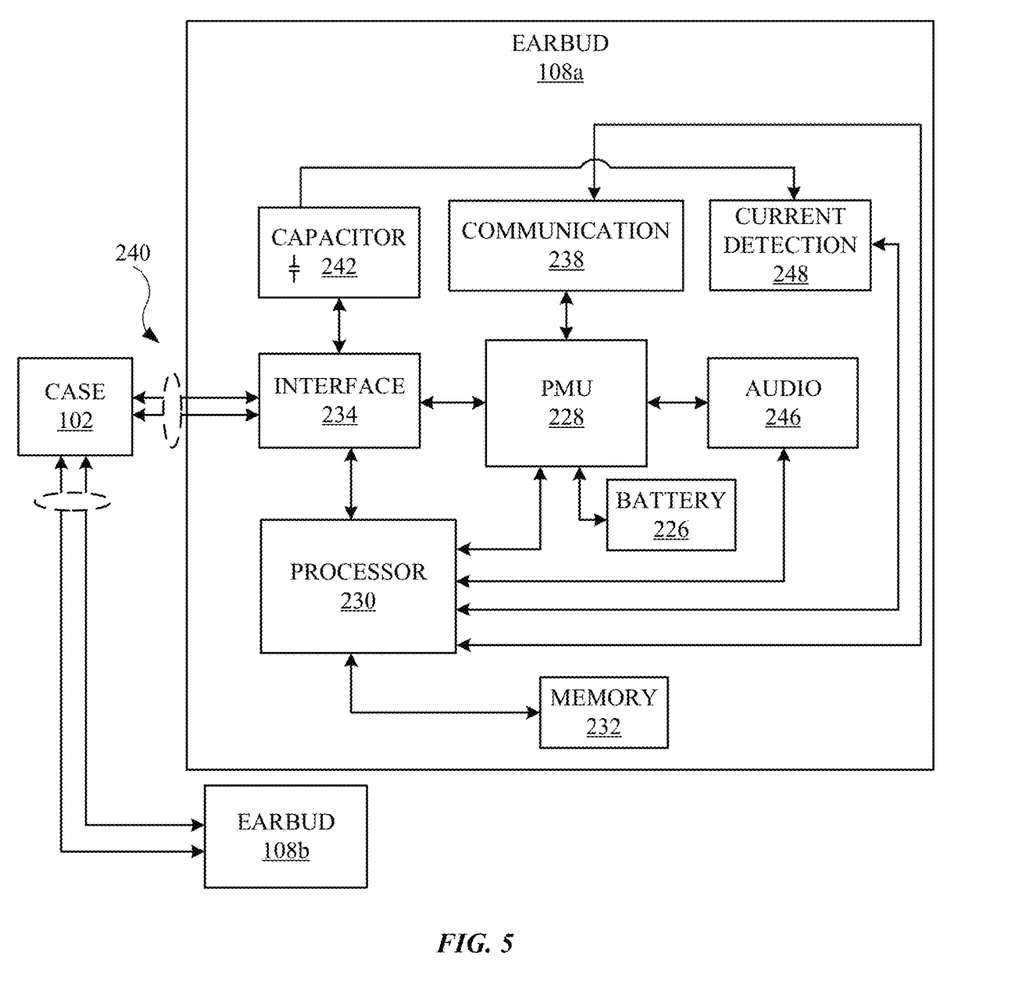
FIG. 5 illustrates a schematic diagram illustrating an example of a device architecture of an earbud enabling earbud insertion event detection, according to one or more implementations of the subject technology.

FIG. 5 is a schematic diagram illustrating an example of a device architecture of an earbud 108a enabling an earbud insertion event detection. Although the architecture for a single earbud (e.g., earbud 108a) is shown in FIG. 5, the earbud 108b may include any features shown and described for the earbud 108a.

The earbud 108a includes a battery 226, a PMU 228, a processor 230, a memory 232, an interface 234, a communication circuit 238, a capacitor 242, an audio module 246, and a current detection circuit 248. The interface 234 may include an interface circuit with similar hardware and communication features as those of the interface 134 for the case 102 (shown in FIG. 4). The audio module 246 is designed to generate soundwaves (e.g., acoustical energy), and thus may include a diaphragm, or membrane, that can be acoustically driven to produce the soundwaves. Additionally, the audio module 246 may also include a microphone that detects soundwaves and converts the detected soundwaves into audio signals (e.g., digital audio signals).

As a non-limiting example, the communication circuit 238 may include a BLUETOOTH® radio circuit capable of communication with the case 102 and/or the device 122 (shown in FIG. 3). The communication circuit 238 can be controlled by the processor 230 and is able to communicate with the case 102 via the interface 234. The communication circuit 238 can communicate with the communication circuit 138 of the case 102 over the same protocol, and thus are designed to transmit within a given frequency range. Similarly, the signal strength in which the communication circuit 238 transmits may be a function of the transmission power, and may be directly proportional to the transmission power.

As described above with respect to FIG. 4, upon insertion of the earbud 108a into the case 102, the capacitor 242, which is connected to a port 240 (e.g., signal pin) of the interface 234, charges up with a current provided by the case 102 (and in particular, the battery 126). In this regard, the capacitor 242 may transition from a discharged state to a charged state. The port 240 may include the same or similar components as those of the port 140 (shown in FIG. 4). The interface 234 is designed to mate with a corresponding interface of the case 102 through the port 240. The mating results in connection of the corresponding pins (e.g., signal and ground pins). The current drawn by the capacitor 242 may include an in-rush current that is detected by the short-circuit protection circuit 136 (shown in FIG. 4) and is reported to the processor 130 of the case 102 (shown in FIG. 4), which, as discussed above, instructs the PMU 128 to minimize or stop applying the voltage to the signal pin of the port 140 of the case 102 (shown in FIG. 4). Alternatively, or com combination, the processor 130 can disable the communicate circuit 138 (shown in FIG. 4).

The PMU 228 provides power to various components of the earbud 108a, for example, the communication circuit 238, the audio module 246 and the interface 234. The PMU 228 can also provide a state of charge of the battery 226 of the earbud 108a to the processor 230 or directly to the case 102 through the interface 234. In some aspects, the PMU 228 may operate under the control of the processor 230, for example, to reduce transmission power of the communication circuit 238 upon insertion of the earbud 108a in the case 102. This can be done by reducing power of a transmitter circuit of the communication circuit 238. Further, this results in reducing the intermodulation of the radios of the communication circuit 238 of the earbud 108a when the earbud 108 is inserted in the case 102. Put another way, the reduced voltage supply can reduce the transmission power of the communication circuit 138 (shown in FIG. 4) and/or the communication circuit 238, and accordingly, the signal strength is reduced. As described herein, the likelihood of intermodulation between the earbud 108a and the case 102 minimized or prevented. Also, the likelihood of intermodulation between the earbuds 108a and 108b is also minimized or prevented.

II. Power Management Using DC Voltage

Additional communication between the case 102 and the earbuds 108a and 108b may also occur. For example, referring again to FIG. 4, the PMU 128 can receive suitable commands from the processor 130 regarding timing and voltage level provided at the port 140 of the interface 134. The interface 134 can mate with a similar interface of the earbuds 108a and 108b (e.g. interface 243 in FIG. 5), when either of the earbuds 108a or 108b is inserted into the case 102. The port 140 is a dual-pin port, of which one pin is a signal/power pin and the other one is a ground pin. In some embodiments, the port 140 includes a communication and charge transfer port and is used to transfer data and power to the earbuds 108a and 108b. According to an aspect of the subject technology, the case 102, the earbud 108a, and the earbud 108b are operable at multiple, different bias voltage levels, and the PMU 128 of the case 102 can provide these multiple voltage levels based on instructions from the processor 130. For example, the processor 130 can determine the condition of respective batteries of each of earbuds 108a and 108b and instruct the PMU 128 to select a voltage level from one of three bias voltage levels based on the determined condition. In some implementations, the processor 130 may communicate with the earbuds 108a and 108b through the interface 134 to obtain, for example, a state of charge of the batteries of the earbuds 108a and 108b.

The three voltage levels include a first voltage level, a second voltage level, and a third voltage level. The first voltage level is within a range of about 1.6 Volts (V) to 1.8V, the second voltage level is within a range of about 2.4V to 2.9V, and the third voltage level is within a range of about 3.4V to 5V. While the voltage levels are approximations, the voltage levels may vary. However, each voltage level may be a non-overlapping voltage level with respect to the remaining voltage levels. Accordingly, a voltage selected within one of the three voltage levels will perform the function described for the voltage level.

A voltage at or within first voltage level is used, for example, when an initial hand-shaking communication is established between the case 102 and the earbuds 108a and 108b. In this scenario, the respective batteries of each of the case 102 or the earbuds 108a and 108b can be fully charged and the initial hand-shaking communication is powered locally by their respective batteries. Accordingly, no power transfer through the interface 134 takes place. Generally, the initial hand-shaking communication does not significantly reduce the respective charge levels of the batteries of the earbuds 108a and 108b, and most components of the case 102 or the earbuds 108a and 108b are not powered except for the interface 134 of the case 102 and the interfaces (e.g., interface 234 in FIG. 5) of the earbuds 108a and 108b.

The second voltage level is applied by the PMU 128 at the port 140 of the interface 134 when, for example, the case 102 queries the earbuds 108a and/or 108b to determine the state of charge of the batteries of the earbuds 108a or 108b. In some instances, information received from the earbuds 108a and 108b indicates a low battery charge (i.e., 0-10% battery charge level). Alternatively, the second voltage level can be used to verify whether the earbuds 108a and 108b are in a ship mode, i.e., the earbuds 108a and 108b are in warehouse, retail store, in transit to a retail store, or otherwise not initially used by an end user (e.g., customer). When in the ship mode, it is preferable to not use the respective batteries of the earbuds 108a and 108b so that the batteries are not in a low-power or no power state prior to initial use by the end user. In existing solutions, when the charge level of the battery of earbuds is too low for communication, there is no practical way for a case to verify the ship mode. However, with the provision of a voltage at or within the second voltage level, the case 102 provides power to the earbuds 108a and 108b for a closed-loop communication to receive ship mode confirmation. For example, in a closed-loop communication, when the case 102 queries the earbuds 108a and 108b and the earbuds 108a and 108b respond with a "no power" response (while in the closed loop), the response provided by the earbuds 108a and 108b is used as verification the earbuds 108a and 108b are in the ship mode. There may be other conditions that the second voltage level is used, and in those conditions, the power for communication between the case 102 and the earbuds 108a and 108b is supplied by the PMU 128 through the interface 134 at the second voltage level, which provides sufficient headroom (e.g., 0.2V to 1V above the required voltage) for communication initiated by the case 102. However, a voltage provided by the case 102 within the second voltage level is insufficient to charge the respective batteries of the earbuds 108a and 108b.

A voltage at or within the third voltage level applied by the PMU 128 at the port 140 of the interface 134 can enable full communication (e.g., all forms of communication available) between the case 102 and the earbuds 108a and 108b. Also, the third voltage level can, at the same time, charge of the respective batteries of the earbuds 108a and/or 108b. In case either, or both, of the respective batteries of the earbuds 108a and 108b is dead or a relatively low charge level, the case 102 can send a number of commands to enable the power path for the batteries of the earbuds 108a and 108b to be charged via the case 102.

In these described scenarios (i.e., voltage levels), the processor 130 sends instruction to the PMU 128 to provide the respective one of the three voltage levels based on the conditions discussed above, which are detectable by the processor 130. Also, a voltage applied at or within the first voltage level may also be derived from the interface 134 itself rather than the PMU 128.

Referring again to FIG. 5, in one or more implementations, the battery 226 is enabled to be charged through the interface 234 and includes a low-battery output (LBO) to inform the PMU 228 of a low state of charge of the power source. The PMU 228 manages power provisioning to various components of the earbud 108a, for example, the communication circuit 238, the interface 234, the processor 230, and other circuits (not shown for simplicity). The PMU 228 can also provide a state of charge of the battery 226 to the processor 230, or directly to the case 102 through the interface 234. The processor 230 can control the PMU 228 and communications through the interface 234. The communications include, for example, reporting various situations, such as a condition of the battery 226 or a ship mode, in response to requests or queries from the case 102. The earbud 108a is capable of operating under three different modes, for example, under the control of PMU 228, corresponding to the three voltage levels described above.

The first mode of operation is associated with the first voltage level, and accordingly, the first mode of operation may include an initial hand-shaking communication between the case 102 and the earbud 108a. In this mode, the earbud 108a operates with its local power provided by the battery 226 that can be at or near a full charge. As a result, the earbud 108a does not receive power from the case 102 to charge the battery 226. In the first mode, the interface 234 may be the only powered component. For example, the processor 230, which consumes a relatively high amount of electrical current as compared to the most other components (e.g., PMU 228 and interface 234) of the earbud 108a, is powered down. In this regard, two-way communication is established between the case 102 and the earbud 108a, without the primary controlling component (e.g., the processor 230) being active. Beneficially, power (e.g., power stored in the battery 126 of the case 102 shown in FIG. 4) is conserved.

The second mode of operation is associated with the second voltage level, and accordingly, the second mode of operation may include, for example, be a ship mode or when the battery 226 of the earbud 108a does not have enough charge to support communication with the case 102. In the second mode of operation, the battery 226 is not used for the communications initiated by the case 102. Rather, the power for the communications is provided by the case 102.

The third mode of operation is associated with the third voltage level, and accordingly, the third mode of operation may enable a power path for the battery 226 to receive charge, i.e., increase the charge level of the battery 226. At the third mode of operation, the charging of the battery 226, under the control of the PMU 228, can be provided from the case 102 simultaneously with communications between the case 102 and the earbud 108a through the interface 234 and the interface 134 (shown in FIG. 4).

Figure 6:
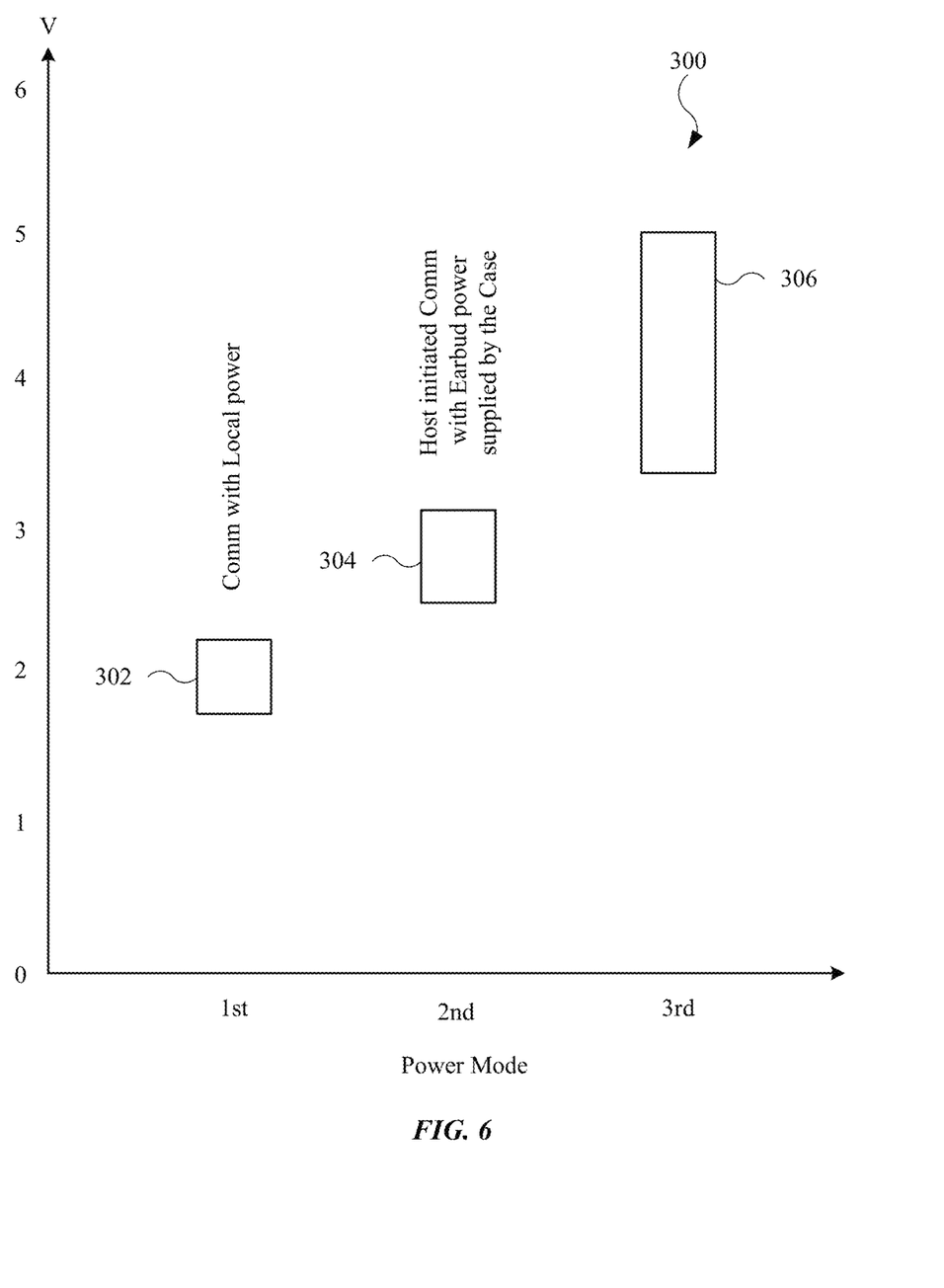
FIG. 6 illustrates a chart showing three modes on which an earbud can operate, according to one or more implementations of the subject technology.

FIG. 6 illustrates a chart 300 showing three voltage levels on which an earbud can operate. The chart 300 is a bar chart showing three bars—a first bar 302, a second bar 304, and a third bar 306—corresponding to the three modes of operation for earbuds described herein. Moreover, the three bars correspond to three different voltages levels, each of which may be provided by a case (or a power component thereof) to one or more earbuds described herein. The first bar 302 indicates an operating voltage level of within a range of about 1.8V to 2.4V that is provided locally by a power source of a case described herein.

The second bar 304 indicates an operating voltage level of within a range of about 2.4V to 2.9V. Further, the second bar 304 can provide verification of a ship mode of earbuds described herein. Based on voltage provided by the case within the second bar 304, the battery of the earbud may not have enough charge to support communications initiated by the case. However, the case provides power for the communications through an interface (e.g., interface circuit) of the case, and high power consumption components, such as a processor (used as the central processing unit of the earbud that provides the core processing functionality) and other circuits remain powered off. Despite the inoperability of the earbud processor due to the inactive (powered off) state, the second mode, however, is able to provide sufficient voltage, including additional headroom voltage, for communication signals.

The third bar 306 indicates an operating voltage level within a range of about 3.4V to 5V, that is provided by a PMU of a case described herein. In the third mode, normal communications between the case and the earbuds may proceed while the earbud batteries are simultaneously being charged by the case.

Beneficially, for two of the three described modes of operation of the earbud, such as the first mode and the second mode, most of the circuits of the earbud, particularly, the processor, are powered off and only the interface circuits is active/powered to handle the communications. In view of the relatively small batteries of the case and especially the relatively small batteries of the earbuds, a significant advantage can result in longer battery life and better user experience. It should be noted that while the three voltage levels (or modes of operation) can be applied in a successive manner starting from the first voltage level and ending with the third voltage level, there is no need to apply the three voltage levels in a successive manner, and cases described herein can start with any of the three voltage levels at any time. Also, while interaction between a case and a single earbud is described, it should be noted that interaction between the case and either, or both, of the earbuds may occur, including simultaneous interaction between the case and the earbuds.

Figure 7:
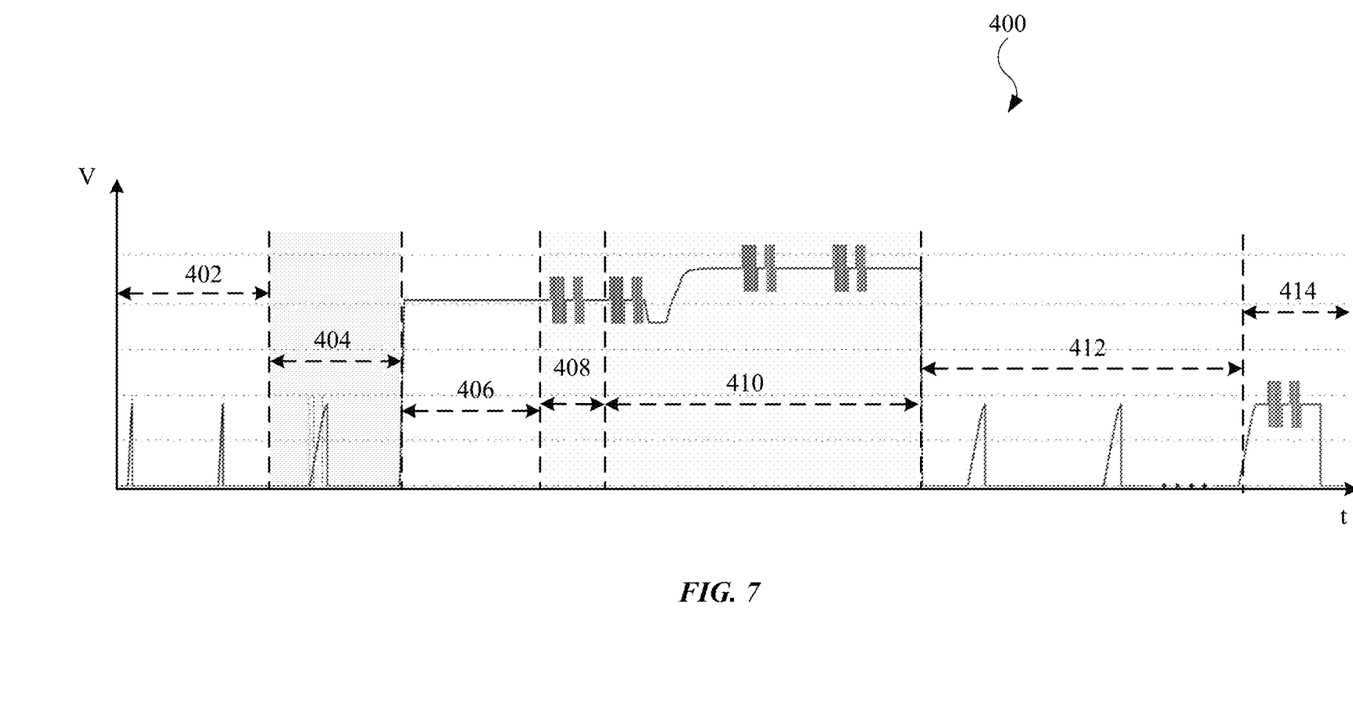
FIG. 7 illustrates a timing chart showing an example of a case-to-earbud communication and earbud charging event, according to one or more implementations of the subject technology.

FIG. 7 illustrates a timing chart 400 illustrating an example of a case-to-earbud communications and earbud charging event. The timing chart shows various functional aspects of case-to-earbud communications in different periods 402, 404, 406, 408, 410, 412, and 414. In the description herein, one earbud is considered. However, the process is the same for the other earbud. During the periods 402 and 404, a capacitance detection (CapDetect) process is being performed. During the period 402, capacitance detect pulses (about 1.8V) are applied to the signal pin of an interface port of an earbud, as described above, to charge the capacitance (e.g., 310 of FIG. 3) of the earbud (e.g., 108a of FIG. 1) that is mated with the case (e.g., 102 of FIG. 1). However, no capacitance is detected, indicating that the earbud is not present in the case.

During the period 404, capacitance current is detected indicating that the earbud is present (i.e., in the case). The period 406 is a pre-charge period, where the case provides some charging for the earbud, because, for example, the earbud battery may be completely dead, and waits for the earbud to boot.

After the earbud boot is complete, during the period 408, first, the communications between the case and the earbud is established, and then the communication continues along with charging the batteries of the earbud. The communications may include instructing the earbud to reduce its transmission power, as discussed above, to reduce intermodulation.

During period 410, the case can charge the earbud(s). The status (e.g., battery charge level) of the earbud(s) can periodically sent to the case, thus updating the case on the status of the earbud. The period 412 is a so-called heartbeat period, when charging the earbud is complete and the pulses are used to maintain cap-detection, as described with respect to the period 402. During the period 414, the case and the earbud can communicate without a need for charging the earbud battery. In some instances, power for the communication is provided by the case to conserve battery charge of the earbud.

III. Case Communication with an Earbud with Power Conservation

Figure 8:
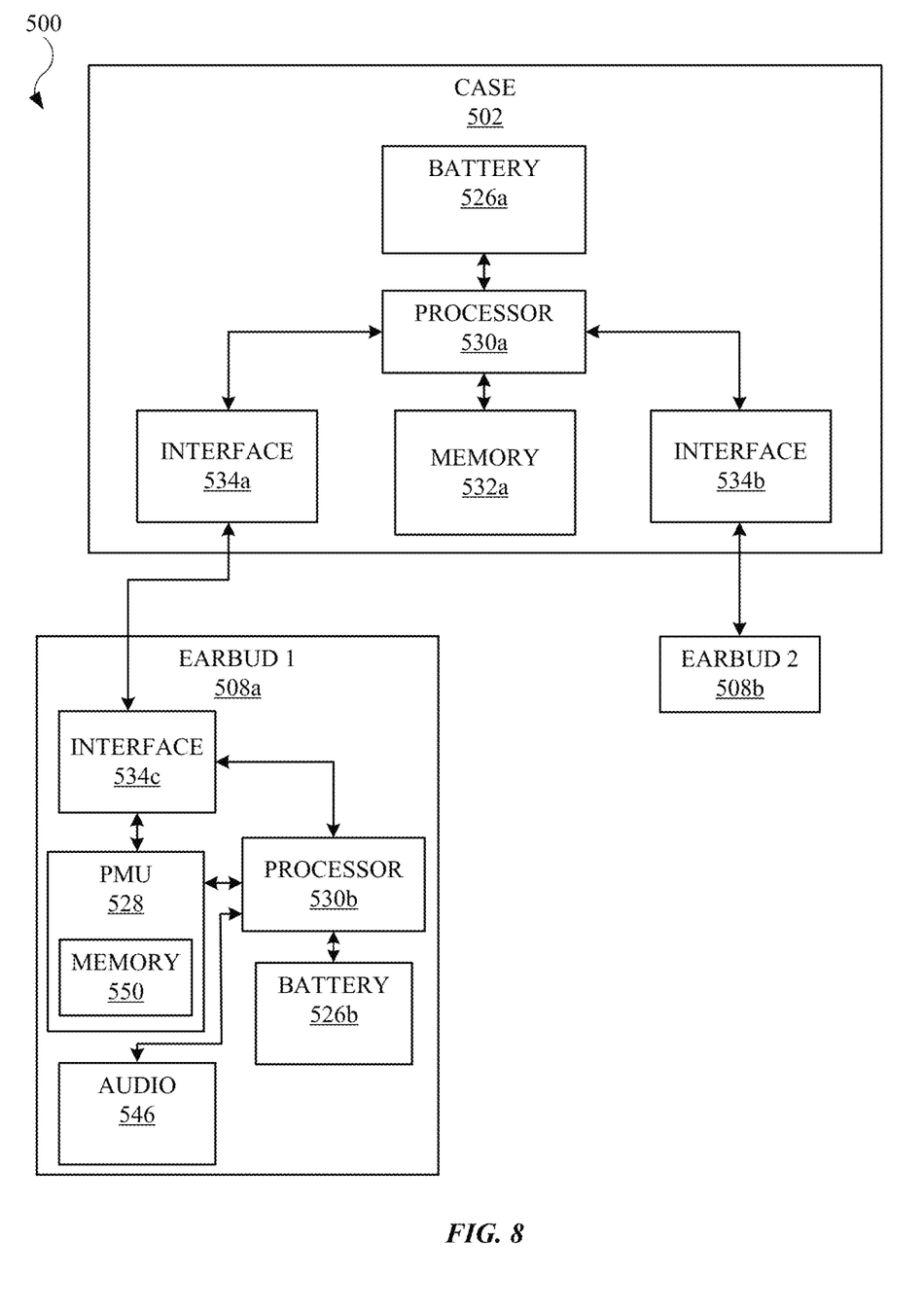
FIG. 8 illustrates a system showing an additional example of communication between a case and earbuds, according to one or more implementations of the subject technology.

FIG. 8 illustrates a system 500 showing another form of communication between a case 502 and earbuds 508a and 508b. Based on interface circuits, including their respective communication protocols and processes, the case 502 can receive information from either of the earbuds 508a and 508b, despite no communication with the respective processors (i.e., central processing units) of the earbuds 508a and 508b.

As shown, the case 502 includes a processor 530a used as a central processing unit. Accordingly, the processor 530a may include one or more control circuits (e.g., MEMS control circuits, application-specific control circuits, SOC, or the like) that provides the central processing functions of the case 502. The case 502 further includes a memory 532a that stores executable instructions for the various processes described herein. The case 502 further includes an interface 534a and an interface 534b used to communicate with the earbud 508a and the earbud 508b, respectively. The case 502 further includes a battery 526a that stores and provides power to the components of the case 502, including those shown and described herein as well as other components not shown.

The earbud 508a includes a processor 530b that, similar to the processor 530a of the case 502, provides the central processing functions of the earbud 508a. Additionally, the earbud 508a includes an interface 534c designed to communicate with the interface 534a of the case 502. The interface 534c may include similar hardware (e.g., circuitry) as that of the interface 534a, and may operate on the same communication protocol. In this regard, one of the interface 534a and the interface 534c may be identified as a host and the other can be identified as the device. For example, the interface 534a may act as a host, while the interface 534c acts as a device.

The earbud 508a further includes an audio module 546 that generates sound waves based on instructions from the processor 530b. The earbud 508a further includes a battery 526b that powers the various components of the earbud 508a, including components shown and not shown.

The earbud 508a further includes a PMU 528. The PMU 528 may include several components, such as firmware, software, memory, and a central processing unit. As shown in FIG. 8, the PMU 528 includes memory 550. The PMU 528 can communicate with the processor 530b. In this regard, the PMU 528 can receive information, such as the battery charge level of the battery 526b. Moreover, the PMU 528 can receive a parameter (or one or more parameters), such as a voltage level (e.g., current voltage level) at the processor 530b, temperature of the processor 530b (based on a temperature sensor in the earbud 508a), and/or electrical current at the processor 530b. While the battery charge level may provide direct information related to the battery 526b, the voltage, temperature, and/or electrical current may be used to indirectly determine or calculate the battery charge level of the battery 526b. Using the memory 550, the PMU 528 can store the information received from the processor 530b. Also, the information may be provided by the processor 530b of the earbud 508a to the PMU 528 (in particular, to the memory 550) prior to the processor 530b entering an inactive state, which is discussed below.

The earbud 508b may include any features shown and described herein for the earbud 508a, and accordingly, may function in a similar manner to that of the earbud 508a.

The case 502 can receive the information stored on the memory 550 of the PMU 528. For example, the processor 530a of the case 502 may instruct the interface 534a of the case 502 to query the interface 534c to request the information from the PMU 528 that is stored on the memory 550. For example, the interface 534a can generate and transmit an electrical communication signal (e.g., one or more voltage pulses) to the interface 534b, which is then transmitted to the PMU 528, causing the PMU 528 to respond with information stored on the memory 550. When the information is received, the processor 530a of the case 502 can determine the battery charge level of the battery 526b of the earbud 508a and determine whether to supply voltage to charge the battery 526b.

Moreover, based on the communication path shown in FIG. 8, the case 502 can receive the information even when the processor 530b is in an inactive state, i.e., powered down. For example, in the closed position of the case 502 (e.g., similar to the closed position of the case 102 in FIG. 1 in which the lid 106 covers the body 104), the processor 530b of the earbud 508a can be placed in the inactive state, provided the earbud 508a is stored in the case 502. In another example, the battery 526b of the earbud 508a may include a battery charge level that is insufficient (i.e., too low) to power the processor 530b. Nonetheless, the interface 534a can communicate with the interface 534c to, for example, query the PMU 528 for information stored on the memory 550. The interface 534c receives the information stored on the memory 550 and provides the information to the interface 534a, thus allowing the case 502 to receive the information. Accordingly, in some instances, the processor 530b of the earbud 508a can be bypassed and the case 502 can still receive information from the earbud 508a. The processor 530b, having a relatively high current (and power) consumption as compared to that of the PMU 528, does not consume electrical current in the inactive state. Beneficially, the battery life (i.e., respective charge levels) of the batteries 526a and 526b can be conserved.

It should be noted that when the case 502 is in the open position (e.g., case 102 in FIG. 2), the earbud 508a can be removed and put in use by a user. Upon opening a lid of the case 502 or upon removing the earbud 508a from the case 502, the processor 530b can transition from the inactive state to an active state, thus allowing the processor 530b to perform functions, such as instruct the audio module 546 to generate soundwaves for the user, generate instructions for the interface 534c to communicate with the case 502, and/or generate instructions for a radio (not shown in FIG. 8) to communicate with a corresponding radio (not shown in FIG. 8) of the case 502 and/or a corresponding radio of the device 122 (shown in FIG. 3).

Figure 9:
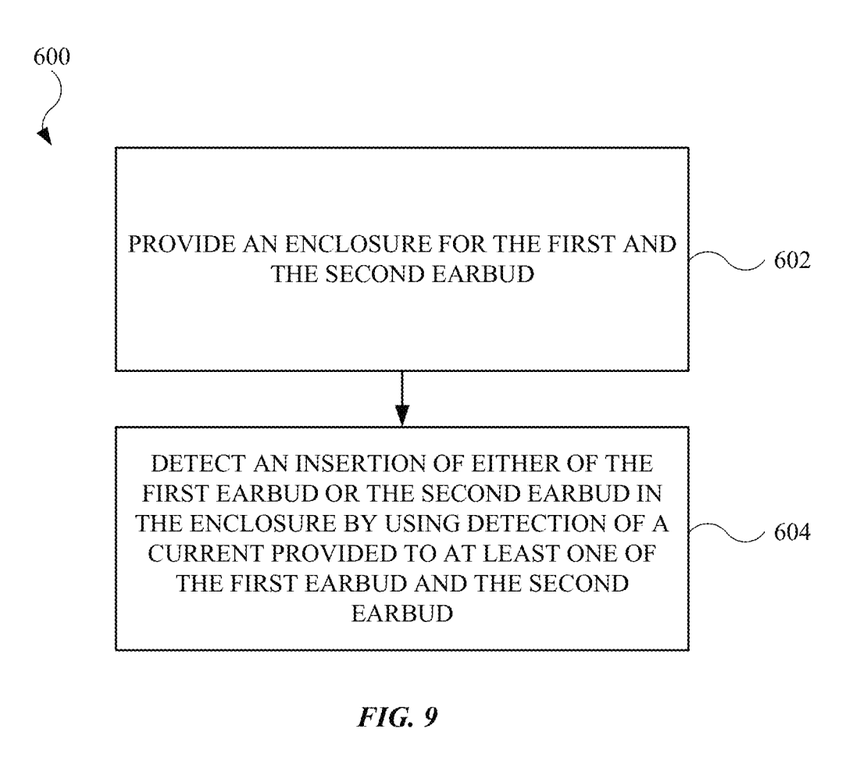
FIG. 9 illustrates a flowchart showing a method for managing transmission power in a device, according to one or more implementations of the subject technology.

FIG. 9 illustrates a flowchart showing a method 600 for managing transmission power in a device. The method 600 may be performed in part by a case described herein. By managing transmission power, the signal strength of radios in the case and/or earbuds used with the case can be reduced, thus reducing the likelihood of intermodulation.

In step 602, an enclosure is provided for the first and the second earbuds. The enclosure may take the form of a case body. The case may include a battery, a power path, a processor, a short-circuit protection circuit, and an interface, as non-limiting examples.

In step 604, an insertion of either of the first earbud or the second earbud is detected in the enclosure by using detection of a current provided to at least one of the first earbud and the second earbud. To determine the insertion, the battery may provide a (static) DC voltage, via the interface circuit, to charge a (previously discharged) capacitor of the earbud(s). The short-circuit protection circuit can determine a short circuit event, in which the short circuit protection limit is surpassed. The short circuit event can be transmitted to the processor, and the processor can signal the interface to reduce power provided to the earbud(s), thus reducing transmission power and signal strength of a radio circuit of the earbud(s). Alternatively, or in combination, the processor can reduce transmission power and signal strength of a radio circuit of the case. In either event, the signal strength reduces the likelihood of intermodulation, allowing faster initiation of communication between the case and the earbud(s), and ensuring compliance with RF emission regulations.

Figure 10:
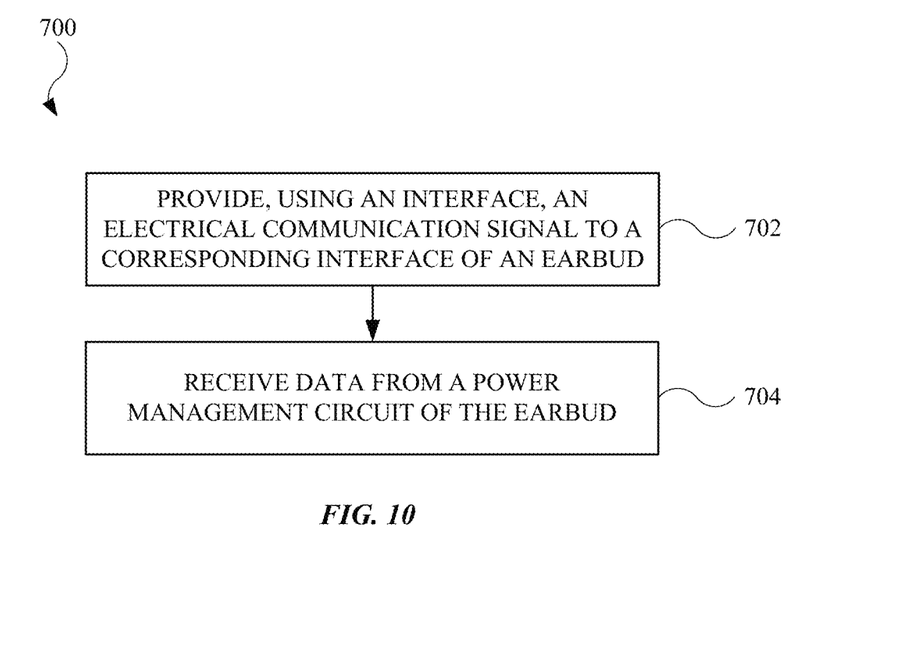
FIG. 10 illustrates a flowchart showing a method for communicating with an earbud, according to one or more implementations of the subject technology.

FIG. 10 illustrates a flowchart showing a method 700 for communicating with an earbud. The method 700 may be performed by a case described herein. The case may include a battery, a power path, a processor, and an interface, as non-limiting examples. The method 700 may include communication occurring between the case and the earbud without communication between an interface (of the case) and a processor (e.g., central processing unit) of the earbud. Accordingly, the processor of the earbud may be in an inactive state while the communication occurs between the interface of the case and an interface of the earbud.

In step 702, an electrical communication signal is provided, using the interface of the case, to a corresponding interface of the earbud. The electrical communication signal may include a voltage in the form of a pulse or a series of pulses, as non-limiting examples. The power supply of the case may provide the voltage. The interface of the case may query and instruct the corresponding interface of the earbud to request information stored on memory of a PMU.

In step 704, data is received, based on the electrical communication signal, from a power management circuit, or PMU, of the earbud. In some embodiments, the interface circuit of the earbud is enabled and can be placed into different modes based on an applied voltage. At least one of the most may allow the interface circuit to query the power management circuit the earbud to receive data (e.g.,) battery charge level, voltage, temperature, and/or current) stored on a memory of the power management circuit. Further, the data may be provided to PMU, which is stored on memory and received form the processor. The processor may provide the data to the PMU, including PMU memory, prior to the processor entering an inactive state. The data stored on the PMU memory is transmitted via respective interfaces of the earbud and the case, in response to the query by the interface of the case. The data can then be used by the case to determine the battery charge level of a battery of the earbud. As a result, the case can determine whether to charge the battery of the earbud.

Figure 11:
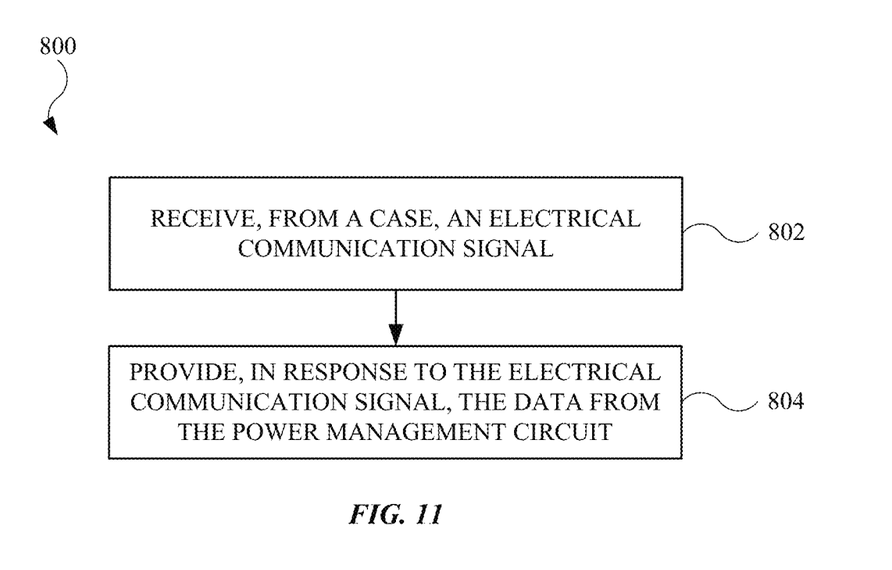
FIG. 11 illustrates a flowchart showing a method for communicating with a case, according to one or more implementations of the subject technology.

FIG. 11 illustrates a flowchart showing a method 800 for communicating with a case. The method 800 may be performed by an earbud described herein. The earbud may include a battery, a PMU, a processor, and an interface, as non-limiting examples. The method 800 may include communication occurring between the case and the earbud without communication between the interface the case and a processor (e.g., central processing unit) of the earbud. Accordingly, the processor of the earbud may be in an inactive state while the communication occurs between the interface of the case and an interface of the earbud.

In step 802, an electrical communication signal is received from a case. The voltage may be provided by an interface of the case to an interface of the earbud. The electrical communication signal may include a voltage in the form of a pulse or a series of pulses, as non-limiting examples. To provide the voltage, the case may include a battery.

In step 804, in response to the electrical communication signal, the data is provided from the power management circuit, or PMU. In some embodiments, the interface circuit of the earbud is enabled and can be placed into different modes based on an applied voltage. At least one of the most may allow the interface circuit to query the power management circuit the earbud to receive data may include battery charge level, voltage, temperature, and/or current. Further, the data may be provided by the processor of the earbud to the PMU of the earbud prior to the processor entering an inactive state. The data can be stored on PMU memory of the PMU and transmitted via respective interfaces of the earbud and the case, in response to a query by the interface of the case. The data can then be used by the case to determine the battery charge level of a battery of the earbud. As a result, the case can determine whether to charge the battery of the earbud.

As used herein, the phrase "at least one of" preceding a series of items, with the term "and" or "or" to separate any of the items, modifies the list as a whole rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but rather are intended to be used interchangeably. In one or more implementations, a processor configured to monitor and control an operation or a component may also mean the processor being programmed to monitor and control the operation or the processor being operable to monitor and control the operation.

Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, or any other variations thereof and alike are for convenience and do not imply that a disclosure relating to such phrase(s) is essential to the subject technology, or that such disclosure applies to all configurations of the subject technology. A disclosure relating to such phrase (s) may apply to all configurations or to one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise", as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neutral genders (e.g., her and its), and vice versa. Headings and subheadings, if any, are used for convenience only and do not limit the subject disclosure.

What is claimed is:

1. A system comprising:
    an earbud comprising:
        a power management circuit comprising memory that stores data, and
        a first interface operatively coupled to the power management circuit; and
    a case comprising a second interface configured to obtain, through communication with the first interface, the data from the power management circuit.

2. The system of claim 1, wherein:
    the earbud further comprises a processor, and
    the second interface is configured to obtain the data while the processor is in an inactive state.

3. The system of claim 2, wherein responsive to the earbud being placed in the case, the processor is placed in the inactive state.

4. The system of claim 2, wherein the second interface bypasses the processor and is in direct communication with the first interface.

5. The system of claim 2, wherein the second interface is configured to obtain the data without communicating with the processor.

6. The system of claim 2, wherein responsive to the earbud being removed from the case, the processor is placed in an active state and is in communication with the power management circuit and the first interface.

7. The system of claim 1, wherein:
    the earbud further comprises a processor and a battery, and
    when the battery is insufficient to power the processor, a voltage is provided by the case to the earbud in order to obtain the data.

8. The system of claim 7, wherein the data comprises one or more of a charge level of the battery, a temperature within the earbud, and a current of the battery.

9. The system of claim 7, wherein:
    the case comprises a processing circuit,
    the data comprises at least one parameter related to the battery, and
    the processing circuit determines a charge level of the battery based on the at least one parameter.

10. The system of claim 9, the at least one parameter comprises one or more of a voltage level, a current, and a temperature.

11. A case for storing and charging an earbud, the case comprising:
    a battery;
    an interface; and
    a processor operatively coupled to the battery and the interface, the processor configured to:
        provide, using the interface, a voltage to a corresponding interface of the earbud, and
        receive, based on the voltage, data from a power management circuit of the earbud.

12. The case of claim 11, wherein the processor is configured to receive the data while bypassing a corresponding processor of the earbud.

13. The case of claim 12, further comprising a body that includes a cavity, wherein responsive to the earbud being positioned in the cavity, the processor is further configured to power down the corresponding processor and receive the data from the power management circuit of the earbud.

14. The case of claim 11, wherein the processor is configured to determine a charge level of an earbud battery based on the received data.

15. The case of claim 14, wherein the received data comprises at least one of a voltage level, a current, and a temperature.

16. An earbud comprising:
    a power management circuit comprising memory that stores data; and
    an interface operatively coupled to the power management circuit, wherein the interface is configured to:

receive, from a case, a voltage, and
provide, in response to the voltage, the data from the power management circuit.

17. The earbud of claim 16, further comprising a processor, wherein the interface is configured to access the data from the power management circuit without communicating with the processor.

18. The earbud of claim 17, wherein the interface is configured to access the data from the power management circuit the processor is in an inactive state.

19. The earbud of claim 17, further comprising a radio circuit, wherein:
in an active state, the processor operates the radio circuit and is operatively coupled to the power management circuit and the interface, and
when the earbud is positioned in the case, the processor is in an inactive state and is powered down.

20. The earbud of claim 17, further comprising a battery, wherein the interface is configured to provide the data when the received voltage is insufficient to charge the battery and/or power the processor.

* * * * *